US008793037B1

(12) United States Patent
Mulbrook et al.

(10) Patent No.: US 8,793,037 B1
(45) Date of Patent: Jul. 29, 2014

(54) LEGACY WAVEFORM IMPLEMENTATION IN A MULTI-FUNCTION ANTENNA

(75) Inventors: Mark M. Mulbrook, Marion, IA (US); Michael L. Hageman, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 658 days.

(21) Appl. No.: 12/876,698

(22) Filed: Sep. 7, 2010

(51) Int. Cl.
*G05D 3/00* (2006.01)
*G05D 1/00* (2006.01)
*G06F 7/00* (2006.01)

(52) U.S. Cl.
USPC ................................ 701/3; 701/470; 701/408

(58) Field of Classification Search
USPC ................... 701/3, 470, 408; 340/572.7, 979; 342/32, 74, 147, 153, 359, 422, 430, 342/449; 455/13.3, 25, 63.4, 83, 431, 562, 455/575.7
See application file for complete search history.

(56) References Cited

U.S. PATENT DOCUMENTS 4,056,781 A * 11/1977 Hetebrij et al. .............. 340/7.21
4,128,839 A * 12/1978 McComas ....................... 342/32
4,196,434 A * 4/1980 Funatsu et al. .................. 342/32
5,065,162 A * 11/1991 Akaba et al. .................. 342/417
6,222,480 B1 * 4/2001 Kuntman et al. ............... 342/30
6,313,783 B1 * 11/2001 Kuntman et al. ............... 342/32
6,788,935 B1 * 9/2004 McKenna et al. ............. 455/431
6,816,114 B1 * 11/2004 Moon et al. ................... 342/359
6,946,950 B1 * 9/2005 Ueno et al. ................... 340/10.1
8,184,601 B2 * 5/2012 Abramov et al. ............. 370/338
2004/0249519 A1 * 12/2004 Frink ................................ 701/3
2006/0040675 A1 * 2/2006 Halfmann et al. ......... 455/456.1
2007/0021069 A1 * 1/2007 Abramov et al. ............ 455/63.4
2011/0096756 A1 * 4/2011 Abramov et al. ............. 370/338

* cited by examiner

*Primary Examiner* — Khoi Tran
*Assistant Examiner* — Jorge Peche
(74) *Attorney, Agent, or Firm* — Donna P. Suchy; Daniel M. Barbieri

(57) ABSTRACT

An antenna having at least a directional mode of operation is mounted onto an aircraft for transmission of avionics waveforms. An orientating module minimizes the power requirements of the antenna by directing an orientation of transmission at least substantially toward a receiver. A processor is coupled with the orientating module for controlling the orientation of transmission. Control programming operates the processor to determine the orientation of transmission and activate the orientating module to direct the antenna to transmit in the determined orientation.

21 Claims, 4 Drawing Sheets

LEGACY WAVEFORM IMPLEMENTATION IN A MULTI-FUNCTION ANTENNA

TECHNICAL FIELD

The present disclosure generally relates to the field of antenna platforms, and more particularly to a system, device, and method for operating legacy avionics waveforms on a directional antenna.

BACKGROUND

In modern aviation, aircraft are required to receive and transmit electromagnetic signals. These signals include waveforms utilized for identification, navigation, communications, collision avoidance, and proximity detection. Many of these legacy waveforms are currently implemented on omni-directional antenna platforms. However, the avionics industry is constantly seeking to reduce the Size, Weight, Power, and Cost (SWAP-C) for its equipment. Therefore, an antenna platform with reduced SWAP-C is desirable and the novel antenna system described in this application fulfills these criteria.

SUMMARY

A system may include, but is not limited to, an antenna having at least a directional mode of operation mounted onto an aircraft for transmission of avionics waveforms, an orientating module designed to minimize the power requirements of the antenna by directing an orientation of transmission at least substantially toward a receiver, a processor coupled with the orientating module for controlling the orientation of transmission, and control programming that operates the processor to determine the orientation of transmission and activate the orientating module to direct the antenna to transmit in the determined orientation.

A method for transmission of waveforms may include, but is not limited to, directing an orientation of transmission for a directional antenna mounted onto an aircraft to an desired orientation designed to minimize the power requirements of the directional antenna by directing the orientation of transmission for the directional antenna at least substantially toward a receiver, controlling the orientation of transmission for the directional antenna utilizing a processor, and operating the processor to determine the orientation of transmission for the directional antenna and activate an orientating unit to direct the orientation of transmission for the directional antenna to the determined orientation of transmission.

A directional antenna controller device may include, but is not limited to, an orientating module connected to a directional antenna for directing an orientation of transmission for the directional antenna in a desired orientation designed to minimize the power requirements of the directional antenna by directing the orientation of transmission at least substantially toward a receiver, a processor coupled with the orientating module for controlling the orientation of transmission for the directional antenna, control programming that operates the processor to determine the orientation of transmission for the directional antenna and activate the orientating module to direct the orientation of transmission for the directional antenna to the determined orientation, a memory for storing the control programming, and a bus for communicatively coupling the orientating module, the processor, the control programming, and the memory.

A directional antenna controller device may include, but is not limited to, an orientating module connected to a directional antenna for directing the orientation of transmission for the directional antenna to a desired orientation designed to minimize the power requirements of the directional antenna by directing the orientation of transmission at least substantially toward a ground based distance measuring equipment station, a processor coupled with the actuator for controlling the orientation of transmission for the directional antenna, control programming that operates the processor to determine the orientation of transmission for the directional antenna and activate the orientating module to direct the orientation of transmission for the directional antenna to the determined orientation, the control programming including an intelligent transmit algorithm for calculating the orientation of transmission for the directional antenna, a memory for storing the control programming, and a bus for communicatively coupling the orientating module, the processor, the control programming, and the memory, wherein the intelligent transmit algorithm returns data of at least one of the orientation of transmission for the directional antenna or an orientation of the receiver to a flight management system of the aircraft, and wherein the intelligent transmit algorithm utilizes, for determining the orientation of transmission for the directional antenna, at least one of an aircraft heading, an aircraft location, an aircraft destination, a aircraft flight plan, an aircraft velocity, or a ground station location.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the invention may be better understood by those skilled in the art by reference to the accompanying figures in which.

DETAILED DESCRIPTION

Reference will now be made in detail to the subject matter disclosed, which is illustrated in the accompanying drawings.

An antenna platform (ex—antenna system) in accordance with an exemplary embodiment of the present disclosure is shown. The platform 100 may include an antenna. The antenna design may be that of a directional antenna. Directional antenna 110 may be mounted to the exterior surface of an aircraft. Alternately, directional antenna 110 may be mounted within the body of an aircraft. In addition, directional antenna 110 may be configured for the transmission of avionics waveforms (ex—navigation waveforms, communications waveforms, collision avoidance waveforms, proximity detection waveforms).

Figure 1:
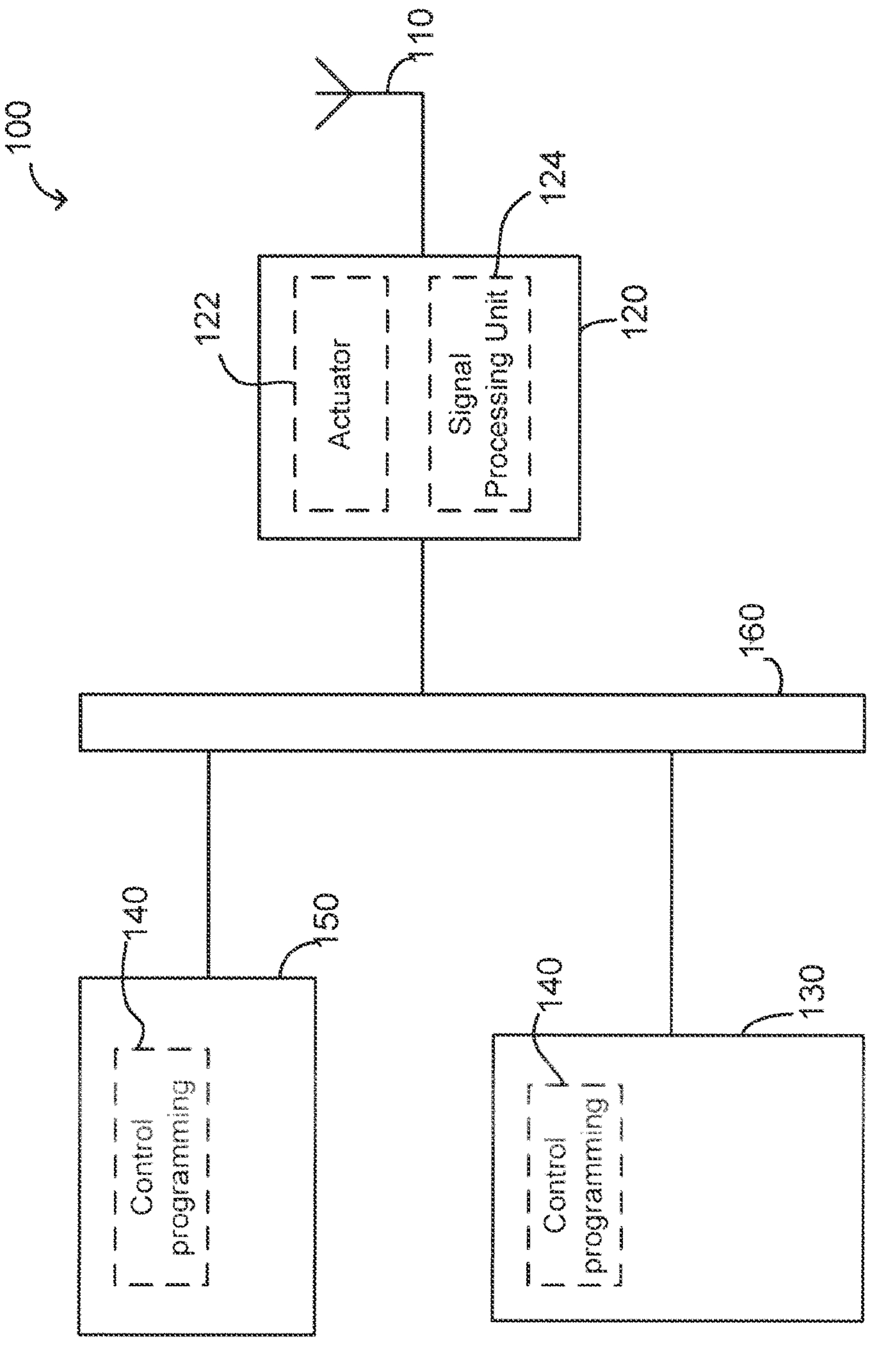
FIG. 1 is a block diagram illustrating an antenna platform.

Referring generally to FIG. 1, directional antenna 110 may be configured to transmit substantially in a single direction (ex—a single quadrant, a single sector). However, other transmission patterns and antenna configurations for directional antenna 110 are contemplated by the current disclosure. For example, directional antenna 110 may be configured to transmit substantially in more than one direction simultaneously. Further, directional antenna 110 may be configured to transmit with a beam width as narrow as one degree. In further embodiments of the present disclosure, directional antenna 110 may operate in various broadcast modes (ex—directional mode, omni-directional mode).

In an exemplary embodiment of the current disclosure, directional antenna 110 may be designed to lower power requirements. It will be appreciated that a directional antenna may improve transmission (ex—increase antenna gain) in a particular direction. Such improvements in transmission in a particular direction may also cause a reduction in transmission (ex—decrease antenna gain) in another direction. Such a directional transmission may reduce power requirements for antenna platform 100 relative to an omni-directional antenna based platform. Subsequently, reduced power requirements may reduce size, weight, and cost requirements for antenna platform 100. It will also be appreciated that an antenna platform of the current disclosure may further incorporate other methods of improving transmitter efficiency (ex—circuit miniaturization, radio frequency (RF) processing improvements, signal processing improvements).

Platform 100 may further include an orientating module 120 connected to directional antenna 110 for directing the transmission of directional antenna 110 in a particular orientation. The particular orientation may be selected to minimize the power requirements of the directional antenna 110. Further, the particular orientation may be selected to direct the transmission of directional antenna 110 at least substantially toward a receiver (ex—other aircraft, airport towers, ground-based stations). Orientating module 120 may be controlled by processor 130.

In an embodiment of the current disclosure, orientating module 120 may further include an actuator 122 connected to directional antenna 110 for mechanically orientating directional antenna 110 in a particular orientation. In an alternate embodiment, orientating module 120 may further include signal processing unit 124 for directing the transmission of directional antenna 110. Signal processing unit 124 may utilize digital signal processing of the avionics waveforms transmitted by directional antenna 110. Signal processing unit 124 may direct the transmission of directional antenna 110 via digital signal processing in a particular orientation without mechanical orientation of directional antenna 110.

Platform 100 may further include a processor 130 for controlling orientating module 120. Processor 130 may execute control programming 140 for operation. Execution of control programming 140 may determine the particular orientation of transmission for directional antenna 110. Further, execution of control programming 140 may activate the orientating module to direct the transmission of the directional antenna to the determined orientation. Control programming 140 may include an intelligent transmit algorithm for determining (ex—calculating) the orientation of transmission for the directional antenna 110. The orientation of transmission for the directional antenna may be a current orientation or a desired orientation. Platform 100 may further include a memory 150 for storing control programming 140. Processor 130 may load instructions of control programming 140 from memory 150 for execution. Processor 130, memory 150, and orientating module 120 may be communicatively coupled via bus 160.

Past utilization of an omni-directional antenna may consist of transmitting a signal and waiting for a response. In contrast, the intelligent transmit algorithm (ex—intelligent transmission algorithm) may utilize a previous orientation of transmission for the directional antenna 110 for calculating the orientation of transmission for the directional antenna. For example, the directional antenna 110 may have performed a previous transmission at the previous orientation of transmission for the directional antenna. In embodiments of the present disclosure, the intelligent transmit algorithm may utilize a time interval until a next transmission of the directional antenna 110 for calculating the orientation of transmission for the directional antenna.

Figure 2:
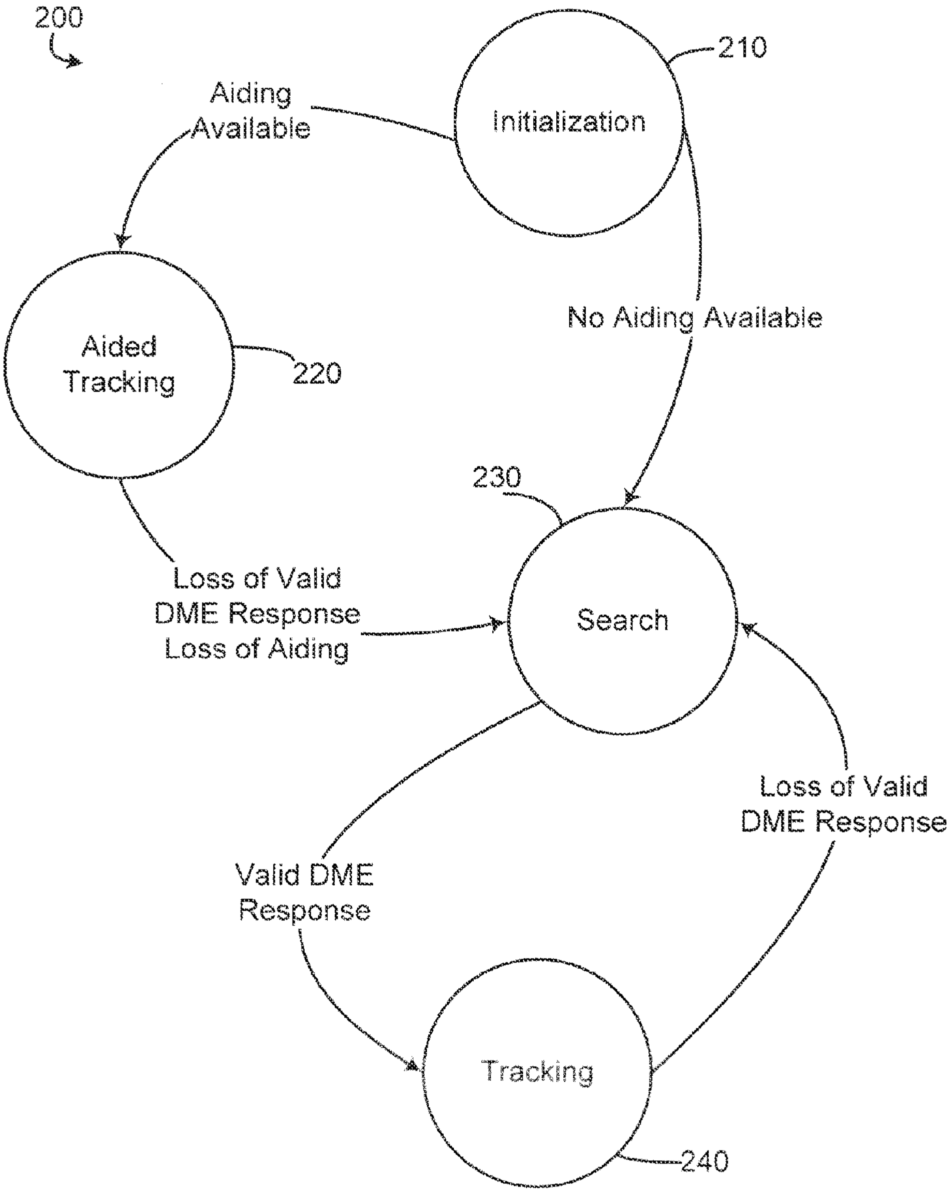
FIG. 2 is a state diagram of an intelligent transmission algorithm for calculating the orientation of the directional antenna.

Referring generally to FIG. 2, a state diagram of an intelligent transmit algorithm for calculating the orientation of transmission for the directional antenna according to the present disclosure is shown. State diagram 200 may include an initialization state 210 for initialization of the intelligent transmit algorithm. The initialization state 210 may transition to one of an aided tracking state 220 or a search state 230. Aided tracking state 220 may utilize data from the initialization state 210 for calculating the orientation of transmission for the directional antenna. Initialization state 210 may transition to aided tracking state 220 when data from the initialization state 210 is available for aiding the tracking of the intelligent transmit algorithm. Initialization state 210 may transition to a search state 230 if data from the initialization state 210 is not available for aiding the tracking of the intelligent transmit algorithm. Search state 230 may perform signal transmissions and calculate a future orientation of transmission for the directional antenna until a connection is established. For example, a connection may be established between the directional antenna and a distance measuring equipment (DME) ground station. However, other avionics connections are contemplated by the current disclosure.

Aided tracking state 220 may transition to search state 230 if a valid connection is lost or a valid connection is never made utilizing the initialization state data. Search state 230 may transition to tracking state 240 if a connection is established. For example, the directional antenna may receive a valid response from a DME ground station. Tracking state 240 may monitor the established connection. Further, tracking state may transition to search state 230 if the established connection is lost. For example, the directional antenna may stop receiving a valid response from a DME ground station.

Figure 3:
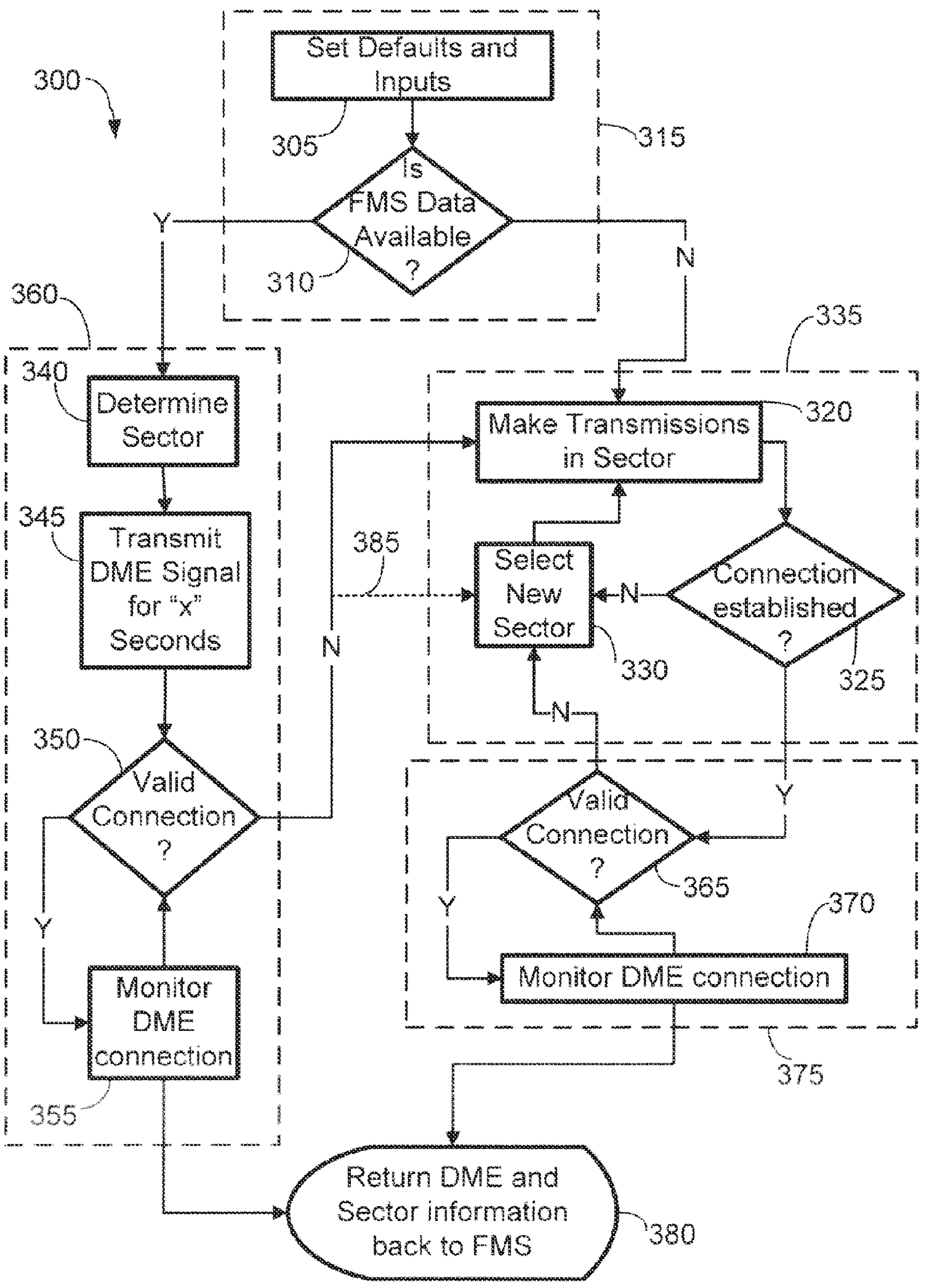
FIG. 3 is a flowchart of a method for operation of an antenna platform utilizing an intelligent transmission algorithm.

Referring generally to FIG. 3, a flowchart illustrating a method of operation of an aircraft antenna platform utilizing an intelligent transmit algorithm is shown. For example, the antenna platform may operate for establishing connection with various DME ground stations. The method 300 may include a block 305 representing setting the defaults and the inputs for the intelligent transmit algorithm. The defaults for the intelligent transmit algorithm may include an initial sector and directional information for a particular DME ground station for the algorithm. The inputs for the intelligent transmit algorithm may include the DME frequency for a particular DME ground station. The method 300 may further include a block 310 representing determining an availability of flight management system (FMS) data of the aircraft for the intelligent transmit algorithm. For example, the FMS data may include one or more of an aircraft heading, an aircraft location, an aircraft destination, an aircraft flight plan, an aircraft velocity, or a location of a potentially proximal DME ground station, and the like. Blocks 305 and 310 may approximate an initialization phase 315 of the intelligent transmit algorithm.

The method 300 may further include a block 320 representing making a transmission in a sector. For example, the transmission may be a series of DME pulse pairs. The sector may be set by an initialization phase 315 or may be calculated by the intelligent transmit algorithm. For example, a sector may be one of four quadrants the antenna platform may be configured to transmit within. However, it is contemplated that an antenna platform may be configured to transmit in more than four directional orientations. The directional orientations may vary in scope relative to each other. The method 300 may proceed to block 320 from block 310 upon determining FMS data is insufficiently available for determining a sector for transmission.

The method 300 may further include a block 325 representing determining if a connection has been established. For example, a DME receiver of the aircraft may search for pulse pairs from a DME ground station corresponding with previously transmitted pulse pairs. The method 300 may further include a block 330 representing selecting a new sector for transmission. For example, selecting a new sector may include incrementing the sector. Alternatively, more complex algorithms may be utilized to select a new sector depending on the number of possible sectors or the configuration of the possible sectors. The method 300 may proceed to block 330 from block 325 upon determining a connection has not been established. Blocks 320, 325, and 330 may approximate a search phase 335 of the intelligent transmit algorithm.

The method 300 may further include a block 340 representing determining a sector for transmission. For example, the FMS data may be utilized to determine a most likely sector for the location of a DME ground station. The method 300 may further include a block 345 representing transmitting a DME signal for a period of time. The period of time may be included in the defaults of block 305. The method 300 may further include a block 350 representing determining the presence or absence of a valid connection. A valid connection may include an aircraft interrogator locking on to a DME ground station. The method 300 may further include a block 355 representing monitoring a DME connection. The method 300 may proceed to block 355 from block 350 upon determining the presence of a valid connection. The method 300 may proceed to block 320 from block 350 upon determining the absence of a valid connection. In another embodiment, the method 300 may proceed to block 330 from block 350 upon determining the absence of a valid connection (as shown by dotted arrow 385). Blocks 340, 345, 350, and 355 may approximate an aided tracking phase 360 of the intelligent transmit algorithm.

The method 300 may further include a block 365 representing determining the presence or absence of a valid connection. A valid connection may include an aircraft interrogator locking on to a DME ground station. The method 300 may proceed to block 365 from block 325 upon determining a connection has been established. The method 300 may further include a block 370 representing monitoring a DME connection. The method 300 may proceed to block 370 from block 365 upon determining the presence of a valid connection. The method 300 may proceed to block 330 from block 365 upon determining the absence of a valid connection. Blocks 365 and 370 may approximate a tracking phase 375 of the intelligent transmit algorithm.

Blocks 355 and 370 may further produce data of the current transmission. This data may include information of the current DME ground station or the current transmission sector. The method 300 may further include a block 380 representing returning the data of the current transmission to the FMS for further processing. The method 300 may be utilized for transmission to receivers other then DME ground stations, such as Very High Frequency Omnidirectional Range (VOR) ground stations. Further, the method 300 may be utilized for transmission of signals other than DME signals, such as VOR signals. Antenna platform 100 may perform the method 300 according to an embodiment of the present disclosure.

Figure 4:
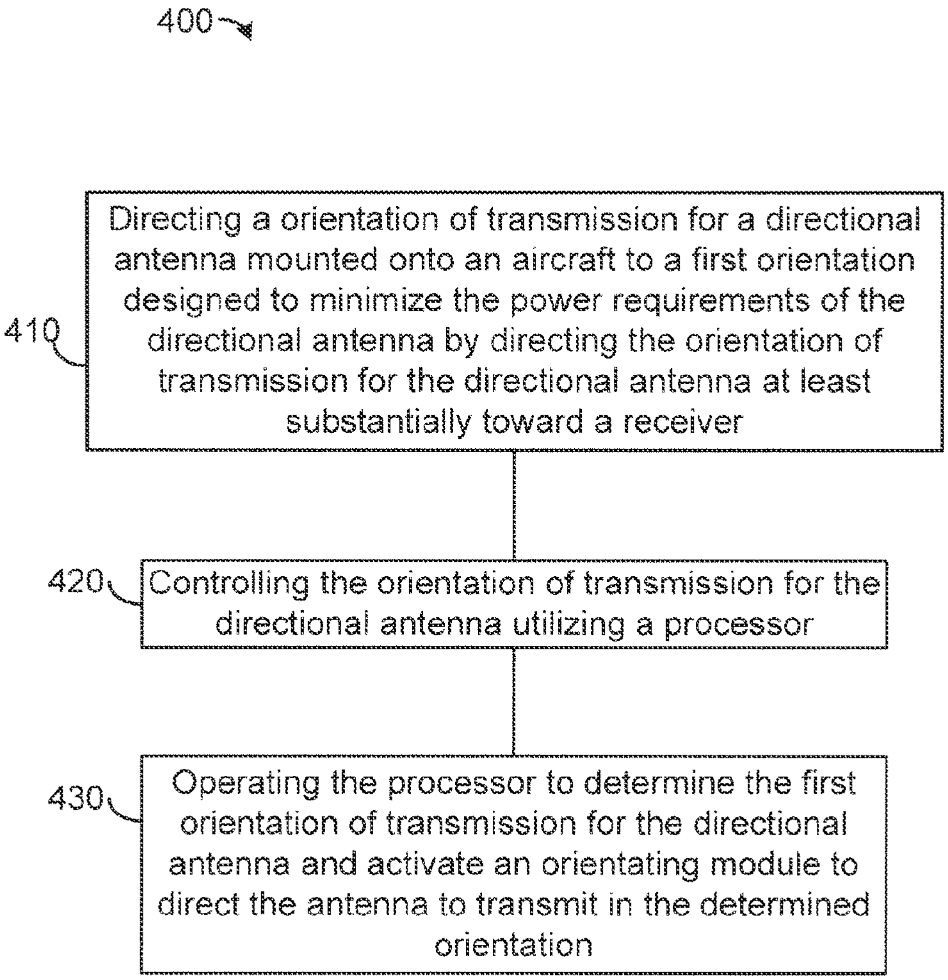
FIG. 4 is a flow diagram illustrating a method of operating an antenna platform.

Referring generally to FIG. 4, a method for transmission of waveforms is shown. The waveforms may be avionics waveforms. A directional antenna may be mounted onto an aircraft. Mounting a directional antenna onto an aircraft may include mounting the directional antenna on an exterior surface of an aircraft. Alternatively, mounting a directional antenna onto an aircraft may include mounting the directional antenna within an aircraft.

The method 400 may include the step 410 of directing an orientation of transmission for a directional antenna mounted onto an aircraft to a first orientation designed to minimize the power requirements of the directional antenna by directing the orientation of transmission for the directional antenna at least substantially toward a receiver. In addition, the method 400 may further include the step 420 of controlling the orientation of transmission for the directional antenna utilizing a processor. The method 400 may further include the step 430 of operating the processor to determine the first orientation of transmission for the directional antenna and activate an orientating unit to direct the orientation of transmission for the directional antenna to the determined orientation of transmission.

Antenna platform 100 may perform the method 400 according to an embodiment of the present disclosure.

In the present disclosure, the methods disclosed may be implemented as sets of instructions or software or firmware readable by a device. Such software may include a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A directional antenna controller device, comprising:

a memory configured to store control programming;

a processor coupled to the memory and an orientating module, wherein the processor is configured to load the control programming and to execute the control programming, wherein execution of the control programming by the processor performs a method, the method including:

calculating a particular orientation of transmission based at least upon a time interval until a next transmission of the directional antenna; and communicating the particular orientation of transmission to the orientating module upon calculating the particular orientation of transmission; and the orientating module being configured to communicatively connect to a directional antenna, wherein the orientating module is configured for:

receiving the particular orientation of transmission from the processor; and directing the directional antenna to transmit at least substantially toward a receiver upon receiving the particular orientation of transmission from the processor, wherein directing the directional antenna to transmit at least substantially toward the receiver reduces the power requirements of the directional antenna.

2. The device of claim 1, wherein the directional antenna operates in at least one of a directional mode or an omnidirectional mode.

3. The device of claim 1, wherein the receiver includes at least one ground-based distance measuring equipment station.

4. The device of claim 1, wherein the control programming includes:

an intelligent transmit algorithm for calculating the orientation of transmission for the directional antenna.

5. The device of claim 4, wherein the intelligent transmit algorithm returns data of at least one of the receiver or the orientation of transmission for the directional antenna to a flight management system of the aircraft.

6. The device of claim 1, wherein calculating a particular orientation of transmission based at least upon a time interval until a next transmission of the directional antenna further comprises:

calculating the particular orientation of transmission based at least upon the time interval until the next transmission of the directional antenna and a previous orientation of transmission.

7. The device of claim 1, wherein calculating a particular orientation of transmission based at least upon a time interval until a next transmission of the directional antenna further comprises:

calculating the particular orientation of transmission based at least upon a previous orientation of transmission and the time interval until the next transmission of the directional antenna.

8. The device of claim 1, wherein performance of the method upon the execution of the control programming by the processor further includes:

calculating at least one future orientation of transmission.

9. The device of claim 8, wherein calculating a particular orientation of transmission based at least upon a time interval until a next transmission of the directional antenna further includes:

calculating the particular orientation of transmission based at least upon the time interval until the next transmission of the directional antenna and at least one calculated future orientation of transmission.

10. The device of claim 1, wherein performance of the method upon the execution of the control programming by the processor further includes:

calculating at least one future orientation of transmission prior to the directional antenna establishing a connection with the receiver.

11. The device of claim 10, wherein calculating a particular orientation of transmission based at least upon a time interval until a next transmission of the directional antenna further includes:

calculating the particular orientation of transmission based at least upon the time interval until the next transmission of the directional antenna and at least one calculated future orientation of transmission.

12. The device of claim 1, wherein performance of the method upon the execution of the control programming by the processor further includes:

calculating at least one future orientation of transmission upon the directional antenna's loss of a connection with the receiver.

13. The device of claim 12, wherein calculating a particular orientation of transmission based at least upon a time interval until a next transmission of the directional antenna further includes:

calculating the particular orientation of transmission based at least upon the time interval until the next transmission of the directional antenna and at least one calculated future orientation of transmission.

14. The device of claim 1, wherein performance of the method upon the execution of the control programming by the processor further includes:

monitoring an established connection between the directional antenna and the receiver.

15. The device of claim 1, wherein performance of the method upon the execution of the control programming by the processor further includes:

determining whether flight management system data is available.

16. The device of claim 15, wherein the flight management system data includes data being associated with at least one of an aircraft heading, an aircraft location, an aircraft destination, an aircraft flight plan, an aircraft velocity, or a ground station location.

17. The device of claim 15, wherein calculating a particular orientation of transmission based at least upon a time interval until a next transmission of the directional antenna further includes:

calculating the particular orientation of transmission based at least upon the time interval until the next transmission of the directional antenna and the flight management system data upon a determination that the flight management system data is available.

18. The device of claim 1, wherein performance of the method upon the execution of the control programming by the processor further includes:

setting defaults and inputs.

19. The device of claim 1, wherein performance of the method upon the execution of the control programming by the processor further includes:

setting defaults and inputs, wherein the defaults include at least one of an initial sector or directional information for particular distance measuring equipment and wherein the inputs include a distance measuring equipment frequency;

determining whether flight management system data is available;

monitoring a loss or establishment of any connection between the directional antenna and the receiver; and calculating at least one future orientation of transmission upon determining whether the flight management system data is available and upon monitoring the loss or establishment of any connection between the directional antenna and the receiver, and wherein calculating the particular orientation of transmission based at least upon the time interval until the next transmission of the directional antenna further includes:

calculating the particular orientation of transmission based at least upon the time interval until the next transmission of the directional antenna and at least one calculated future orientation of transmission.

20. The device of claim 1, wherein performance of the method upon the execution of the control programming by the processor further includes:

setting defaults and inputs, wherein the defaults include an initial sector and directional information for particular distance measuring equipment and wherein the inputs include a distance measuring equipment frequency;

determining whether flight management system data is available;

monitoring a loss or establishment of any connection between the directional antenna and the receiver; and calculating at least one future orientation of transmission upon a determination that flight management system data is available and upon monitoring the loss or establishment of any connection between the directional antenna and the receiver, and wherein calculating the particular orientation of transmission based at least upon the time interval until the next transmission of the directional antenna further includes:

calculating the particular orientation of transmission based at least upon the time interval until the next transmission of the directional antenna and at least one calculated future orientation of transmission and flight management system data.

21. A directional antenna controller device, comprising:

a memory configured to store control programming;

a processor coupled to the memory and an orientating module, wherein the processor is configured to load the control programming and to execute the control programming, wherein execution of the control programming by the processor performs a method, the method including:

calculating a particular orientation of transmission;

communicating the particular orientation of transmission to the orientating module upon calculating the particular orientation of transmission; and setting defaults and inputs, wherein the defaults include at least one of an initial sector or directional information for particular distance measuring equipment and wherein the inputs include a distance measuring equipment frequency; and the orientating module being configured to communicatively connect to a directional antenna, wherein the orientating module is configured for:

receiving the particular orientation of transmission from the processor; and directing the directional antenna to transmit at least substantially toward a receiver upon receiving the particular orientation of transmission from the processor, wherein directing the directional antenna to transmit at least substantially toward the receiver reduces the power requirements of the directional antenna.

* * * * *